United States Patent [19]

Meshri et al.

[11] Patent Number: 5,318,764
[45] Date of Patent: Jun. 7, 1994

[54] PROCESSES OF PRODUCING POTASSIUM FLUOROALUMINATES

[75] Inventors: Dayal T. Meshri; Sampath H. Kumar; Sudhir S. Bhagat; Dinshaw B. Contractor; Sanjay Meshri, all of Tulsa, Okla.

[73] Assignee: Advance Research Chemicals, Inc., Catoosa, Okla.

[21] Appl. No.: 973,721

[22] Filed: Nov. 9, 1992

[51] Int. Cl.$^5$ .............................................. C01F 7/50
[52] U.S. Cl. .................................................... 423/465
[58] Field of Search ...................... 423/465, 116, 462; 148/26

[56] References Cited

U.S. PATENT DOCUMENTS

| 1,937,956 | 12/1933 | Henninger | 423/465 |
| 2,991,159 | 7/1961 | Wendt | 423/116 |
| 4,428,920 | 1/1984 | Willenberg et al. | D15/5 |
| 4,579,605 | 4/1986 | Kawase et al. | 148/26 |

FOREIGN PATENT DOCUMENTS

0087272  4/1956  Norway ............................ 423/465

OTHER PUBLICATIONS

Phillips, et al. Dec. 1966, Equilibria in KAIF$_4$-Containing Systems, Journal of The American Ceramic Society, vol. 49, No. 12, pp. 631–634.

Aluminum Werke, "Producing Cryolite From Washing and Waste Liquors Containing Sodium Fluoride", Chemical Abstracts, 1956 vol. 51, 7672a, b.

J. W. Mellor, "Inorganic and Theoretical Chemistry", 1946, vol. V, pp. 306–307, vol. II, pp. 516–517.

Primary Examiner—Benjamin R. Fuller
Assistant Examiner—Valerie Ann Lund
Attorney, Agent, or Firm—Head & Johnson

[57] ABSTRACT

Potassium tetrafluoroaluminate and potassium hexafluoroaluminate have been produced by three new processes: (a) by reacting alumina trihydrate with freshly produced, hot, solvated potassium fluoride or potassium bifluoride solution in presence of stoichiometric amounts and/or an excess of hydrogen fluoride, or (b) by reacting aluminum trifluoride trihydrate with hot aqueous solution in potassium fluoride or potassium bifluoride, or (c) by generating in situ potassium aluminate by reacting alumina trihydrate with hot aqueous potassium hydroxide and treating the same with aqueous or anhydrous hydrogen fluoride.

8 Claims, No Drawings

PROCESSES OF PRODUCING POTASSIUM FLUOROALUMINATES

BACKGROUND OF THE INVENTION

1. Field of the Invention

The present invention relates to several simple, energy efficient and advantageous processes of producing potassium tetrafluoroaluminate, potassium hexafluoroaluminate and their mixtures.

2. Description of the Related Art

The conventional technical methods of producing potassium tetrafluoroaluminate like (a) reacting alumina trihydrate, hydrofluoric acid and potassium hydroxide, or (b) evaporation of a mixture obtained by combining stoichiometric amounts of the reactive components, or (c) melting together comminuted potassium fluoride and aluminum fluoride at temperatures above 600° C. and grinding the resulting solidified melt, suffer from one or several disadvantages. Some of these disadvantages are product melting at temperatures above 620° C., low yields, or high energy requirements leading to loss of cost effectiveness of the process.

The process described by Willenberg et. al. (U.S. Pat. No. 4,428,920) claims a method for the production of potassium tetrafluoroaluminate melting below 575° C. The process claims the formation and existence of tetrafluoroaluminic acid from a reaction of alumina trihydrate and hydrofluoric acid and forming the tetrafluoroaluminate by subsequent neutralization with potassium hydroxide. The process is claimed to yield a product of melting point not exceeding 575° C. The problem associated with this process is that the existence of tetrafluoroaluminic acid is still debatable in the scientific literature. It is quite likely that the previous art which describes tetrafluoroaluminic acid is a solution of aluminum trifluoride in aqueous HF which may lead to uncertainty of the product composition. Therefore, the prior art becomes limited in scope to produce material of desired composition. It became necessary for us to develop a unique process to manufacture not only the pure forms of Potassium Fluoroaluminates, i.e. $KAlF_4$ and $K_3AlF_6$, but also the products corresponding to different desired mixtures of the two, especially the eutectic composition of the system $KF-AlF_3$ which melts at 560° C. or below and can be a better candidate as a superior flux (pure $KAlF_4$ melts at 574° C. and $K_3AlF_6$ melts at 985° C.).

Thus, we report here novel methods of manufacturing which are very energy efficient as well as more generally applicable, furthermore, the composition of the end product can easily be tailored to suit the needs by only variation in the ratio of the reactants used.

SUMMARY OF THE INVENTION

Potassium tetrafluoroaluminate and potassium hexafluoroaluminate have been produced by three new processes: (a) by reacting alumina trihydrate or aluminum oxide with freshly produced, hot, solvated potassium fluoride, potassium bifluoride (or a combination thereof) solution in the presence of stoichiometric amounts and/or an excess of hydrogen fluoride; (b) by reacting aluminum trifluoride trihydrate with a hot aqueous solution in potassium fluoride or potassium bifluoride, or; (c) by generating in situ potassium aluminate by reacting alumina trihydrate or aluminum oxide with hot aqueous potassium hydroxide and treating the same with aqueous or anhydrous hydrogen fluoride.

The unique advantages of the present processes aid in the production of the said compounds both in pure form as well as mixtures (which exhibit superior performance as fluxes) by only a minor variation in the ratio of the reactants. Further, the processes are all comprised of a single pot reaction with the internal energy of the system being fully and efficiently utilized to trigger and sustain the reaction to completion. In addition, the present invention leads to the production of pure materials of proven superior performance as established by various physicochemical methods of analysis and performance evaluation tests.

Four main objectives of the present invention are to provide: (a) a process of universal applicability for the production of potassium tetrafluoroaluminates; (b) a process making use of the internal energy of the system for the production of the said compounds thus making it energy efficient and superior to all those in prior known art; (c) a process which, with minor variations, can yield different mixtures of the fluoroaluminates which cater to the varied melting behaviors demanded by their use as fluxes and other industrial applications, and; (d) a process that can be carried out in a single pot in convenient batches. The said processes thus overcome the disadvantages of the prior art.

Other objects of the present invention and advantageous features thereof will become apparent during the course of the description.

DESCRIPTION OF THE PREFERRED EMBODIMENT

The first process, hereafter referred to as "Process A", according to the present invention of producing potassium tetrafluoroaluminate or potassium hexafluoroaluminate comprises the following steps:

Reacting stoichiometric amounts of commercially available alumina trihydrate with a potassium fluoride solution and/or potassium bifluoride solvated with aqueous or anhydrous hydrofluoric acid, the said solvated potassium fluoride solution is produced by the neutralization of commercially available potassium hydroxide solution with hydrofluoric acid, and subjecting the resulting mixture to a separation operation to recover and isolate the potassium fluoroaluminate. The filtrate is recycled.

Investigation on the phase equilibria of the aluminum trifluoride and potassium fluoride (B. Philips, C.M. Warshaw, and J. Mocrin in "Journal of the American Ceramics Society" vol. 49 p. 631 (1966)) have revealed the presence of a solid phase with a composition of $KAlF_4$ for an equimolar mixture of aluminum trifluoride and potassium fluoride with a melting point of 574° C. and in addition, an eutectic phase melting at a lower temperature of 560° C. which is closer in composition to $KAlF_4$ but contains also the other potassium fluoroaluminate; $K_3AlF_6$, the potassium cryolite. Thus, as mentioned earlier, with only minor variations of the amounts of reactants, we have produced both the pure species i.e. $KAlF_4$ or $K_3AlF_6$ or the eutectic mixture of the former with the latter to produce a low melting material. It may be mentioned here that the latter mixture is of great applicability as a brazing flux. According to the present invention, (a) for $KAlF_4$ a preferred molar ratio with respect to the total charge is a molar ratio of potassium to aluminum within the range of 1.0 and 1.19, and (b) for $K_3AlF_6$, a molar ratio of potassium to aluminum 2.95 to 3.01.

It is advantageous to freshly prepare the solvated potassium fluoride solution to provide the solvated species KF.nHF, where "n" can be 3-6, preferably 3-4 for $KAlF_4$, and 1-6, preferably 1-2 for $K_3AlF_6$. The hydrofluoric acid for generating the solvated potassium fluoride species can be in the concentration range of 20% by weight to 100% by weight, preferably in the range of 50% by weight to 70% by weight. It has been found by experimentation that preparing fresh solvated potassium fluoride solution by the neutralization of potassium hydroxide with hydrofluoric acid produces a more reactive species and ultimately a purer product.

An aqueous potassium hydroxide solution of a concentration between 10% by weight to 46% by weight, and more conveniently the commercially available solutions with concentration in the range of 36% by weight to 45% by weight are used for the generation of solvated potassium fluoride species.

The reaction of the alumina trihydrate or aluminum oxide with the solvated potassium fluoride solution can be carried out at a temperature within the range between room temperature and the boiling point of the reaction mixture. The preferred temperatures are those between 60° C. and 100° C.

The precipitation of the reaction product can be effected in any desired manner, but a preferred mode for a batch process would be to generate the solvated potassium fluoride species and then add the alumina trihydrate or aluminum oxide to the same container.

It has been found that a polyethylene reaction vessel is well suited for this process due to the fact that polyethylene does not interfere with the reaction process. When the solvated potassium fluoride solution is prepared through a neutralization of the potassium hydroxide with hydrofluoric acid, a significant amount of heat is released. This heat of reaction is necessary to trigger and sustain the rest of the process, however, polyethylene begins to melt at approximately 130° C. For this reason, the hydrofluoric acid must be added at a rate such that the temperature of the solution does not exceed approximately 110° C. It is possible to use metal reaction vessels, such as stainless steel, monel or nickle, however, it has been determined that the metal reacts with the process causing slight impurities in the final product. A glass reaction vessel would also sustain the heat, however, glass is highly reactive with hydrofluoric acid, thereby rendering it unsuitable for this application. For this reason, vessels made of non-reactive material are preferred, such as polyethylene, polypropylene, Teflon ®, Kynar ®, rubber, or graphite-lined metal.

The addition of the alumina trihydrate can be completed in 5-30 minutes depending on the size of the batch. It is preferable to stir the reaction mixture during the addition of the alumina trihydrate, the latter being added in a continuous stream. The stirring can then be discontinued. The reaction is allowed to complete over a period of 2 to 6 hours, with no heating at any stage. The exothermicity of the reaction in both the steps eliminates altogether any external energy requirements for the process thus making it a highly energy efficient one.

The product can be isolated by adopting conventional separation procedures such as filtration, centrifugation, pressure cartridge, the press mill or drying the whole mass when stoichiometry is used. The yields are stoichiometric, for example, 97% to 99% based on alumina trihydrate or aluminum oxide.

EXAMPLE 1

Small Batch a Eutectic Mixture of $KAlF_4$ and $K_3AlF_6$ according to Process A In order to produce the above eutectic, $KAlF_4$ and $K_3AlF_6$, in a small batch, 3.35 Kg of 45% potassium hydroxide (KOH) were added in a polyethylene vessel and placed on a scale. Carefully, 3.36 Kg of 70% hydrofluoric acid (HF) was pumped into the vessel and the reaction was allowed to take place. HF was added at a rate such that the temperature of the solution reached but did not exceed 110° C. due to the released heat of reaction. This is due to the fact that polyethylene begins to melt at approximately 130° C. After all of the HF was added and the temperature of the solution between 60° C. and 110° C., 1.844 Kg of alumina trihydrate was added while the reaction mixture was stirred. The alumina trihydrate was added quite rapidly, in about 10 minutes during continuous mixing. After the addition of alumina stirring was ceased and there was an induction period where no activity took place.

Following the induction period, activity in the mixture became vigorous and the temperature again rose, leveling off at approximately 106° C. This reaction period took about 1 to 3 hours. The mixture was continuously stirred so as to ensure complete reaction and to decrease the time of reaction.

The resulting suspension was thick due to the loss of water as a result of the heat of reaction, so $H_2O$ was added to make a slurry. The slurry was then pumped out and centrifuged. At the conclusion of the centrifuge cycle, the product remaining in the centrifuge basket was collected, dried in a tray oven at 150° C. and then pulverized. Upon examination, the process revealed 3.438 Kg of $KAlF_4$ which corresponds to a yield of 102.4% based on Alumina Trihydrate used. Yields are over 100% due to the presence of $K_3AlF_6$ in the Eutectic.

EXAMPLE 2

Large Batch of a Eutectic Mixture of $KAlF_4$ and $K_3AlF_6$ according to Process A In order to produce eutectic $KAlF_4$ in a large batch, a polyethylene vessel was placed on a scale and 166.0 Kg of 45% potassium hydroxide (KOH) was added. Carefully, 166.0 Kg of 70% hydrofluoric acid (HF) was pumped into the vessel and the reaction was allowed to continue. HF was added at a rate such that the temperature of the solution reached but did not exceed 110° C. due to the released heat of reaction. HF was added slowly so that the temperature of the solution did not exceed 110° C. due to the fact that polyethylene begins to melt at approximately 130° C.

After all of the HF was added and the temperature of the solution between 60° C. and 100° C., 91.0 Kg of alumina trihydrate was added while the reaction mixture was stirred. In contrast, the alumina trihydrate was added quite rapidly, between 15 and 30 minutes during continuous mixing. After the addition of alumina, stirring was ceased and an induction period commenced where no activity took place.

Following the induction period, activity in the mixture became vigorous and the temperature again rose, leveling off at approximately 106° C. This reaction period took between one and three hours. The mixture was continuously stirred so as to ensure complete reaction and to decrease the time of reaction.

The resulting suspension was very thick due to the loss of water as a result of the heat of reaction, so $H_2O$ was added to make a slurry. The slurry was then pumped out and centrifuged. At the conclusion of the centrifuge step, the product remaining in the centrifuge basket was collected, dried in an oven at 150° C. and then pulverized. Upon examination, the process revealed 172 Kg of $KAlF_4$ corresponds to a yield of 103.8% based upon alumina trihydrate used. Yields over 100% are due to the presence of $K_3AlF_6$ in the Eutectic.

EXAMPLE 3

Small Batch of $K_3AlF_6$ according to Process A

In order to produce $K_3AlF_6$ in a small batch, a polyethylene vessel was placed on a scale and 8.999 Kg of 45% potassium hydroxide (KOH) was added. Carefully, 4.686 Kg of 70% hydrofluoric acid (HF) was pumped into the vessel and the reaction was allowed to take place. HF was added at a rate such that the temperature of the solution reached but did not exceed 110° C. due to the released heat of reaction. The temperature of the solution was not allowed to exceed 110° C. due to the fact that polyethylene begins to melt at approximately 130° C.

After all of the HF was added and the temperature of the solution between 60° C. and 100° C., 1.874 Kg of alumina trihydrate was added while the reaction mixture was stirred. The alumina trihydrate was added quite rapidly, in about 30 minutes during continuous mixing. After the addition of alumina, stirring was continued during an induction period where no activity took place.

Following the induction period, activity in the mixture became vigorous and the temperature again rose, leveling off at approximately 106° C. This reaction period took about one to three hours. The mixture was continuously stirred so as to ensure complete reaction and to decrease the time of reaction.

The resulting suspension was very thick due to the loss of water as a result of the heat of reaction, so $H_2O$ was added to make a slurry. The slurry was then pumped out and centrifuged. At the conclusion of the centrifuge cycle, the product remaining in the centrifuge basket was collected, dried in an oven at 110° C. and then pulverized. Upon examination, the process revealed 6.135 Kg of $K_3AlF_6$ which corresponds to a yield of 98.9% based upon alumina trihydrate used.

EXAMPLE 4

Large Batch of $K_3AlF_6$ according to Process A

In order to produce $K_3AlF_6$ in a large batch, a polyethylene vessel was obtained and placed on a scale and 218.2 Kg of 45% potassium hydroxide (KOH) was added. Carefully, 105 Kg of 70% hydrofluoric acid (HF) was pumped into the vessel and the reaction was allowed to take place. HF was added at a rate such that the temperature of the solution reached but did not exceed 110° C. due to the released heat of reaction. The temperature of the solution was not allowed to exceed 110° C. due to the fact that polyethylene begins to melt at approximately 130° C.

After all of the HF was added and the temperature of the solution was between 60° C. and 100° C., 45.45 Kg of alumina trihydrate was added while the reaction mixture was stirred. The alumina trihydrate was added quite rapidly in about 30 minutes to an hour during continuous mixing. After the addition of alumina, stirring was continued during an induction period where no activity took place. Following the induction period, activity in the mixture became vigorous and the temperature again rose, leveling off at approximately 106° C. This reaction activity period took about one to three hours. The mixture was continuously stirred so as to ensure complete reaction and to decrease the time of reaction.

The resulting suspension was very thick due to the loss of water as a result of the heat of reaction, so $H_2O$ was added to make a slurry. The slurry was then pumped out and centrifuged. At the conclusion of the centrifuge cycle, the product remaining in the centrifuge basket was collected, dried in an oven at 150° C. and then pulverized. Upon examination, the process revealed 144.55 Kg of $K_3AlF_6$ which corresponds to a yield of 96% based on alumina trihydrate used.

Table I shows the weight of reactants used, the product yield and percent yield based on alumina for Examples 1 through 4.

TABLE I

Production of Eutectic $KAlF_4$ and $K_3AlF_6$ from $KOH/HF/Al_2O_3.3H_2O$

| | KOH (45%) Kg | HF (70%) Kg | Alumina Kg | Yield Kg | % Yield based on alumina |
|---|---|---|---|---|---|
| $KAlF_4$ Eutectic | | | | | |
| Example 1 | 3.353 | 3.357 | 1.844 | 3.438 | 102.4 |
| Example 2 | 166.0 | 166.0 | 91.0 | 172 | 103.8 |
| $K_3AlF_6$ | | | | | |
| Example 3 | 8.999 | 4.686 | 1.874 | 6.135 | 98.9 |
| Example 4 | 218.2 | 105 | 45.45 | 144.5 | 96.0 |

Examples 5–10 show the manner in which additional experiments using Process "A" were carried out. Examples 5–10 disclose all molar ratios where the mole quantities mentioned are all gram moles. Table II lists the reaction conditions.

EXAMPLES 5–10

Eutectic Mixture of $KAlF_4$ and $K_3AlF_6$ according to Process A

In a typical experiment a known amount of potassium hydroxide was taken in a plastic bucket, placed on a scale and the required amount of hydrofluoric acid was carefully pumped into it. After the addition of hydrogen fluoride, alumina trihydrate was added while stirring the reaction mixture. The stirring was discontinued and the stirring assembly removed from the reaction vessel. A vigorous reaction soon followed. The reaction was complete in 30 minutes. The slurry was stirred for another 30 minutes and then filtered. The solid residue was dried in a tray oven. Table II lists the reaction conditions for each Example.

TABLE II

| | KOH % w/w | | HF % w/w | | $Al_2O_3 \cdot 3H_2O$ | Yield in % based on $Al_2O_3 \cdot 3H_2O$ | Analysis | |
|---|---|---|---|---|---|---|---|---|
| | Conc | Mol. | Conc | Mol. | | | K/Al | F/Al |
| $KAlF_4$ Eutectic | | | | | | | | |
| Ex. 5 | 45 | 26.95 | 70 | 117.5 | 11.82 | 102.0 | 1.05 | 4.10 |
| Ex. 6 | 45 | 26.91 | 70 | 118 | 11.82 | 104.0 | 1.03 | 4.12 |
| Ex. 7 | 45 | 423 | 70 | 1843 | 185.1 | 107.0 | 1.06 | 4.08 |
| $K_3AlF_6$ | | | | | | | | |
| Ex. 8 | 45 | 72.32 | 70 | 164 | 12.01 | 99 | 3.3 | 6.3 |
| Ex. 9 | 45 | 1751 | 70 | 3670 | 291 | 98.5 | 3.1 | 6.2 |
| Ex. 10 | 45 | 1751 | 70 | 3670 | 291 | 98.8 | 3.0 | 6.25 |

EXAMPLE 11

Small Batch of Pure $KAlF_4$ according to Process A

In order to produce $KAlF_4$ in a small batch, 2.94 Kg of 45% potassium hydroxide (KOH) were added in a polyethylene vessel and placed on a scale. Carefully, 3.04 Kg of 70% hydrofluoric acid (HF) was pumped into the vessel and the reaction allowed to take place. HF was added at a rate such that the temperature of the solution reached bu did not exceed 110° C. due to the released heat of reaction. This is due to the fact that polyethylene begins to melt at approximately 130° C. After all of the HF was added and the temperature of the solution was between 60° C. and 110° C., 1.844 Kg of alumina trihydrate was added while the reaction mixture was stirred. The alumina trihydrate was added quite rapidly, in about 10 minutes during continuous mixing. After the addition of alumina, stirring was ceased and there was an induction period where no activity took place.

Following the induction period, activity in the mixture became vigorous and the temperature again rose, leveling off at approximately 106° C. This reaction period took about 1 to 3 hours. The mixture was continuously stirred so as to ensure complete reaction and to decrease the time of reaction.

The resulting suspension was thick due to the loss of water as a result of the heat of reaction, so $H_2O$ was added to make a slurry. The slurry was then pumped out and centrifuged. At the conclusion of the centrifuge cycle, the product remaining in the centrifuge basket was collected, dried in a tray oven at 150° C. and then pulverized. Upon examination, the process revealed 3.323 Kg of $KAlF_4$ which was analyzed to have a purity of 99.0 percent and the yield corresponds to 98.98% based upon alumina trihydrate.

PROCESS B

Also an alternative process, hereafter referred to as "Process B," according to the present invention of producing potassium fluoroaluminates comprises the following steps:
  reacting a solution of potassium aluminate with hydrofluoric acid,
  the said potassium aluminate solution can be generated by reacting alumina trihydrate with hot aqueous potassium hydroxide solution.

The production of potassium aluminate can be carried out within a range of reaction temperature between 75° C. and 116° C., more advantageously between 85° C. and 95° C. The heat required can be supplied by traditional methods or generated by dissolution of the potassium hydroxide beads, pellets or powder in water.

The addition of alumina trihydrate to the hot potassium hydroxide solution can be done all at once or in increments with no net effect on the reactivity of the potassium aluminate solution obtained. It is also preferable to stir the mixture to facilitate the dissolution.

It may be mentioned that the concentration ranges for the potassium hydroxide solution as well as the hydrofluoric acid are the same as described under process A.

EXAMPLE 12

Eutectic Mixture of $KAlF_4$ and $K_3AlF_6$ according to Process B

In order to produce eutectic $KAlF_4$, 1.844 Kg of alumina trihydrate was added to 3.353 Kg of hot potassium hydroxide (90° C.) in a polyethylene vessel during vigorous stirring. The mixture was digested further to produce a clear solution.

To the solution, 4.100 Kg of 50% hydrofluoric acid was then carefully added. Eutectic potassium tetrafluoroaluminate precipitated out. The potassium tetrafluoroaluminate product was centrifuged, dried in an oven at 150° C. and then pulverized. Upon examination, the process revealed 3.454 Kg of potassium tetrafluoroaluminate which corresponds to a yield of 102.9% based on alumina trihydrate used. Yields higher than 100% are due to the presence of $K_3AlF_6$.

EXAMPLE 13

Eutectic Mixture of $KAlF_4$ and $K_3AlF_6$ according to Process B

In order to produce eutectic $KAlF_4$, 7.382 Kg of alumina trihydrate was added to 13.415 Kg of hot potassium hydroxide (90° C.) in a polyethylene vessel during vigorous stirring. The mixture was digested further to produce a clear solution.

To the solution, 18.816 Kg of 50% hydrofluoric acid was carefully added. Potassium tetrafluoroaluminate precipitated out. The potassium tetrafluoroaluminate product was centrifuged, dried in an oven at 150° C. and then pulverized. Upon examination, the process revealed 13.960 Kg of potassium tetrafluoroaluminate which is a 103.8% yield based on alumina trihydrate. Yields are higher than 100% are due to the presence of $K_3AlF_6$.

EXAMPLE 14

Pure $KAlF_4$ according to Process B

In order to produce $KAlF_4$, 0.676 Kg of alumina trihydrate was added to 1.078 Kg of hot potassium hydroxide (90° C.) in a polyethylene vessel during vigorous stirring. The mixture was digested further to produce a clear solution.

To the solution, 1.414 Kg of 50% hydrofluoric acid was carefully added. Potassium tetrafluoroaluminate precipitated out. The potassium tetrafluoroaluminate product was centrifuged, dried in an oven at 150° C. and then pulverized. Upon examination, the process revealed 1.220 Kg of potassium tetrafluoroaluminate which corresponded to a yield of 99.5%.

EXAMPLE 15

$K_3AlF_6$ according to Process B

In order to produce $K_3AlF_6$, 0.156 Kg of alumina trihydrate was added to 0.7466 Kg of hot potassium hydroxide (90° C.) in a polyethylene vessel during vigorous stirring. The mixture was digested further to produce a clear solution.

To the solution, 0.504 Kg of 50% hydrofluoric acid was carefully added. Potassium hexafluoroaluminate precipitated out. The product was centrifuged, dried in an oven at 150° C. and then pulverized. Upon examination, the process revealed 0.511 Kg of potassium hexafluoroaluminate which corresponds to a yield of 99% based on alumina trihydrate used.

EXAMPLE 16

$K_3AlF_6$ according to Process B

In order to produce $K_3AlF_6$, 0.516 Kg of alumina trihydrate was added to 0.759 Kg of hot potassium hydroxide (90° C.) in a polyethylene vessel during vigorous stirring. The mixture was digested further to produce a clear solution.

To this solution, 0.496 Kg of hydrofluoric acid was carefully added. Potassium hexafluoroaluminate precipitated out. The potassium hexafluoroaluminate product was centrifuged, dried in an oven at 150° C. and then pulverized. Upon examination, the process revealed 0.512 Kg of potassium hexafluoroaluminate which corresponds to a yield of 99.2% based on alumina trihydrate used.

Table III shows the weight of reactants used, the product yield and the percent yield based on alumina, as illustrated in Examples 12-16.

TABLE III

Production of $KAlF_4$ and $K_3AlF_6$ from $KOH/Al_2O_3.3H_2O/HF$

| | KOH (45%) (Kg) | Alumina (Kg) $Al_2O_3.3H_2O$ | HF (70%) (Kg) | Yield (Kg) | % Yield based on alumina |
|---|---|---|---|---|---|
| $KAlF_4$ Eutectic | | | | | |
| Ex. 12 | 3.353 | 1.844 | 4.100 | 3.408 | 101.5 |
| Ex. 13 | 13.415 | 7.382 | 18.816 | 13.960 | 104.0 |
| $KAlF_4$ | | | | | |
| Ex. 14 | 1.078 | 0.676 | 1.414 | 1.22 | 99.5 |
| $K_3AlF_6$ | | | | | |
| Ex. 15 | 0.7466 | 0.156 | 0.504 | 0.511 | 99.0 |
| Ex. 16 | 0.759 | 0.156 | 0.496 | 0.512 | 99.2 |

Table IV shows mole quantities for these examples.

TABLE IV

| | KOH % w/w Conc | KOH Mol. | HF % w/w Conc | HF Mol. | $Al_2O_3.3H_2O$ Moles | Yield in % based on $Al_2O_3.3H_2O$ | Analysis K/Al | Analysis F/Al |
|---|---|---|---|---|---|---|---|---|
| $KAlF_4$ Eutectic | | | | | | | | |
| Ex. 12 | 45 | 26.95 | 50 | 102.5 | 11.82 | 99 | 1.2 | 4.27 |
| Ex. 13 | 45 | 107.8 | 50 | 470.4 | 47.32 | 98.5 | 1.08 | 4.20 |
| $K_3AlF_6$ | | | | | | | | |
| Ex. 15 | 45 | 6.0 | 50 | 12.6 | 1.0 | 99 | 3.2 | 6.4 |
| Ex. 16 | 45 | 6.0 | 50 | 12.8 | 1.0 | 98.5 | 3.10 | 6.1 |

PROCESS C

Further, another alternative process, hereafter referred to as "Process C" for producing potassium fluoroaluminates comprises of the following steps:

reacting aluminum fluoride trihydrate with hot aqueous potassium fluoride solution, and the said potassium fluoride or potassium bifluoride solution can be generated fresh as in Process A (thereby making use of the heat released to provide the energy input for the reaction) or an already prepared solution can be employed (in which case the process requires an energy input).

The concentration of potassium fluoride used, can be within the range of 25% by weight to 42% by weight and more advantageously between 36% by weight to 40% by weight.

The temperature of the reaction can be within the range of 70° C. and boiling point of the mixture and more advantageously between 80° C. and 95° C.

EXAMPLE 17

$KAlF_4$ according to Process C

In order to produce $KAlF_4$ according to Process C, 0.950 Kg of aluminum trifluoride trihydrate was added in a continuous stream with vigorous stirring to 1.099 Kg of hot (90° C.) aqueous solution of potassium fluoride.

The resulting slurry was digested further for one hour, centrifuged, dried in an oven at 150° C. and then pulverized. Upon examination, the process revealed 0.977 Kg of $KAlF_4$ which corresponds to a yield of 99.9% based on aluminum trifluoride trihydrate used.

EXAMPLE 18

$KAlF_4$ according to Process C

In order to produce $KAlF_4$ according to Process C, 0.949 Kg of aluminum trifluoride trihydrate was added in a continuous stream with vigorous stirring to 1.084 Kg of hot (90° C.) aqueous solution of potassium fluoride.

The resulting slurry was digested further for one hour, centrifuged, dried in an oven at 150° C. and then pulverized. Upon examination, the process revealed 0.975 Kg of $KAlF_4$ which corresponds to a yield of 99.8% based on aluminum trifluoride trihydrate used.

EXAMPLE 19

$K_3AlF_6$ according to Process C

In order to produce $K_3AlF_6$ according to Process C, 0.156 Kg of aluminum trifluoride trihydrate was added in a continuous stream with vigorous stirring to 0.473 Kg of a hot (90° C.) aqueous solution of potassium fluoride.

The resulting slurry was digested further for one hour, centrifuged, dried in an oven at 150° C. and then pulverized. Upon examination, the process revealed 0.257 Kg of $K_3AlF_6$ which corresponds to a yield of 99.9% based on aluminum trifluoride trihydrate used.

EXAMPLE 20

$K_3AlF_6$ according to Process C

In order to produce $K_3AlF_6$ according to Process C, 0.156 Kg of aluminum trifluoride trihydrate was added in a continuous stream with vigorous stirring to 0.458 Kg of a hot (90° C.) aqueous solution of potassium fluoride.

The resulting slurry was digested further for one hour, centrifuged, dried in an oven at 150° C. and then pulverized. Upon examination, the process revealed 0.257 Kg of $K_3AlF_6$ which corresponds to a yield of 99.5% based on aluminum trifluoride trihydrate used.

Table V shows the weight of reactants used, the product yield and percent yield based on alumina for Examples 17 through 20.

TABLE V

Production of $KAlF_4$ and $K_3AlF_6$ from $KF(aq)/AlF_3.3H_2O$

| | KF (38%) (Kg) | $AlF_3.3H_2O$ (Kg) | Yield (Kg) | % Yield based on $AlF_3.3H_2O$ |
|---|---|---|---|---|
| $KAlF_4$ | | | | |
| Ex. 17 | 1.099 | 0.950 | 0.977 | 99.9 |
| Ex. 18 | 1.084 | 0.949 | 0.975 | 99.8 |
| $K_3AlF_6$ | | | | |
| Ex. 19 | 0.473 | 0.156 | 0.257 | 99.9 |
| Ex. 20 | 0.458 | 0.156 | 0.257 | 99.5 |

Table VI shows molar ratios for examples 17 through 20.

TABLE VI

| | KF (aq) % w/w Conc. | Moles | $AlF_3.3H_2O$ Moles | Yield Based $AlF_3.3H_2O$ | Analysis K/Al | F/Al |
|---|---|---|---|---|---|---|
| $KAlF_4$ | | | | | | |
| Ex. 17 | 38 | 7.2 | 6.89 | 99.9 | 1.04 | 4.10 |
| Ex. 18 | 38 | 7.1 | 6.89 | 99.5 | 1.02 | 4.11 |
| $K_3AlF_6$ | | | | | | |
| Ex. 19 | 38 | 3.1 | 1.00 | 99.9 | 3.06 | 6.4 |
| Ex. 20 | 38 | 3.2 | 1.00 | 99.0 | 3.02 | 6.1 |

The preceding Examples serve to illustrate more in detail the processes according to the present invention without, however, being limited thereto. They refer to the production of one or two moles of the fluoroaluminates depending on the type of process. The products have been characterized by the melting point determinations using calibrated muffle furnace and also by differential thermal analysis. Further the products have been characterized by comparing their x-ray powder diffraction patterns with those reported in the literature. The exact composition of the products has been determined by chemical analysis.

As discussed earlier, several variations in the reaction conditions can be effected so that the final composition of the product can be tailored to specific requirements as demanded by the end use. Further, it may also be mentioned that a scale up of the processes is easily done without any net loss of efficiency of the process.

When maintaining the procedural conditions according to the present invention as described under the various processes above there is obtained the desired potassium fluoroaluminate in very good and almost theoretical yields, for instance 99% based on the alumina trihydrate for process A, 99% based on alumina trihydrate for process B and 99% based on alumina trifluoride trihydrate for process C. Also affecting the minor variations in terms of the reactant ratios there is obtained a product with the desired melting characteristics. The product thus obtained is suitable as a brazing flux, as a filler in abrasive agents and several other industrial applications.

"TEFLON ®" as used herein is a registered trademark identifying a commercial polytetrafluoroethylene product. In like manner, "KYNAR ®" as used in this specification is a registered trademark identifying a commercial product that is polyvinylidene fluoride.

While the invention has been described with a certain degree of particularity, it is manifest that many changes may be made in the details of the process and the addition of components without departing from the spirit and scope of this disclosure. It is understood that the invention is not limited to the Examples set forth herein for purposes of exemplification, but is to be limited only by the scope of the attached claim or claims, including the full range of equivalency to which each element thereof is entitled.

What is claimed is:

1. A process for producing potassium tetrafluoroaluminate or potassium hexafluoroaluminate comprising the steps of:
   (1) adding potassium hydroxide to water to obtain a first solution having a percentage by weight of said potassium hydroxide to said water of 20% to 46%;
   (2) supplying a compound selected from the group consisting of hydrofluoric acid and anhydrous hydrogen fluoride, of a weight percent between 20% and 100% to the first solution to form a second solution of the formula KF.nHF, where n=1-6 and a heat of reaction is released;
   (3) maintaining a temperature of the second solution below 110° C.;
   (4) with the temperature of the second solution 50° C. or above, mixing the second solution with a quantity of alumina trihydrate to form a mixture;
   (5) allowing said mixture time to react utilizing the released heat of the reaction of step (2) to trigger and sustain the reaction to form a resulting suspension, the quantity of alumina trihydrate added in step (4) being at least that required to fully react said second solution with said quantity of alumina trihydrate, (6) separating potassium tetrafluoroaluminate or potassium hexafluoroaluminate as reaction products from the resulting suspension.

2. A process according to claim 1 wherein step (6) includes the following substeps:

(7) subjecting the reaction products to a centrifuge;
(8) drying the reaction product; and
(9) pulverizing the reaction product.

3. A process according to claim 1 wherein n in said second solution with the formula KF.nHF is 3-4 in order to produce potassium tetrafluoroaluminate.

4. A process according to claim 1 wherein n in said second solution with the formula KF.nHF 1-3 in order to produce potassium hexafluoroaluminate.

5. A process for producing potassium tetrafluoroaluminate or potassium hexafluoroaluminate comprising the steps of:

(1) exothermically reacting potassium hydroxide with hydrofluoric acid to produce a hot aqueous potassium fluoride solution;
(2) reacting a compound selected from the group consisting of aluminum trifluoride and aluminum trifluoride trihydrate with said hot aqueous potassium fluoride solution from step (1) to obtain a reaction mixture; and
(3) separating the reaction mixture to isolate potassium tetrafluoroaluminate or potassium hexafluoroaluminate.

6. A process according to claim 5 wherein a temperature of the reaction in step (1) is within a range of 70° C. to 110° C.

7. A process according to claim 5 wherein a concentration of the said potassium fluoride solution from step (1) is within the range of 25% to 42% by weight.

8. A process for producing potassium tetrafluoroaluminate or potassium hexafluoroaluminate comprising the steps of:

(1) adding potassium hydroxide to water to obtain a first solution having a percentage by weight of said potassium hydroxide to said water of 20% to 46%;
(2) supplying a compound selected from the group consisting of hydrofluoric acid and anhydrous hydrogen fluoride, of a weight percent between 20% and 100% to the first solution to form a second solution of the formula KF.nHF, where $n=1-6$ and a heat of reaction is released;
(3) maintaining a temperature of the second solution below 110° C.;
(4) with the temperature of the second solution 50° C. or above, mixing the second solution with a quantity of alumina trihydrate to form a mixture;
(5) allowing said mixture time to react utilizing the released heat of the reaction of step (2) to trigger and sustain the reaction to form a resulting suspension, the quantity of alumina trihydrate added in step (4) being less than that required for a complete reaction with said second solution;
(6) separating from said resulting suspension eutectic compositions in a form of $KF/AlF_3$ and mixtures of $KAlF_4$ and $K_3AlF_6$.

* * * * *